US009574680B2

(12) United States Patent
Burlage et al.

(10) Patent No.: US 9,574,680 B2
(45) Date of Patent: Feb. 21, 2017

(54) WATER SAFETY SHUT-OFF VALVE

(71) Applicants: Brian J. Burlage, Marshalltown, IA (US); Roger A. Burlage, Westlake Village, CA (US); Alex Pesek, Lincoln, NE (US)

(72) Inventors: Brian J. Burlage, Marshalltown, IA (US); Roger A. Burlage, Westlake Village, CA (US); Alex Pesek, Lincoln, NE (US)

(73) Assignee: Castlebridge Enterprises, Inc., Westlake Village, CA (US)

(*) Notice: Subject to any disclaimer, the term of this patent is extended or adjusted under 35 U.S.C. 154(b) by 0 days.

(21) Appl. No.: 14/333,162

(22) Filed: Jul. 16, 2014

(65) Prior Publication Data

US 2016/0018017 A1  Jan. 21, 2016

(51) Int. Cl.
*F16K 31/52* (2006.01)
*F16K 31/48* (2006.01)
(Continued)

(52) U.S. Cl.
CPC ............... *F16K 31/48* (2013.01); *F16K 17/20* (2013.01); *F16K 31/5245* (2013.01);
(Continued)

(58) Field of Classification Search
CPC .. F16K 31/05; F16K 31/055; Y10T 137/7723; Y10T 137/7726; Y10T 137/7727; Y10T 137/8158; Y10T 137/8225; Y10T 137/86389; Y10T 137/86397; Y10T 137/86646
(Continued)

(56) References Cited

U.S. PATENT DOCUMENTS 4,106,670 A    8/1978  Yoshiaki Takeda
4,487,076 A *  12/1984 Burlage ............... G01F 1/3209
                                                73/861.24
(Continued)

FOREIGN PATENT DOCUMENTS

DE    102010001087 A1    9/2011
EP        2687763 A1    1/2014
(Continued)

OTHER PUBLICATIONS

European Patent Office, Extended European Search Report, issued in connection to European Regional Application No. 15176625.0, mailed Mar. 16, 2016, 12 pages. Mar. 16, 2016.

*Primary Examiner* — Matthew W Jellett
(74) *Attorney, Agent, or Firm* — McKee, Voorhees & Sease, PLC

(57) ABSTRACT

The present invention is a water conservation safety shut-off valve assembly for use on locations which normally have intermittent water usage but need to indicate when there is constant water usage, such as a leak. The valve assembly has a valve body with a fluid pathway and a valve plug held in an open position allowing water to flow through the pathway. As water flows through the pathway, a sensing device detects water flowing through the pathway and starts a timer. The valve closes the pathway, stopping the flow of water through the valve assembly when the time elapses. The valve assembly indicates whether the valve plug is in an open or closed position.

15 Claims, 8 Drawing Sheets

(51) Int. Cl.
    *F16K 31/524*    (2006.01)
    *F16K 17/20*     (2006.01)
    *F16K 37/00*     (2006.01)
(52) U.S. Cl.
    CPC .... *F16K 31/52408* (2013.01); *F16K 37/0041* (2013.01); *Y10T 137/7726* (2015.04); *Y10T 137/7727* (2015.04); *Y10T 137/86477* (2015.04)
(58) Field of Classification Search
    USPC ........... 251/65, 68, 78, 82, 129.03, 251, 262, 251/263; 137/456, 459, 460, 551, 553, 624.11, 137/624.12, 624.22
    See application file for complete search history.

(56) References Cited

U.S. PATENT DOCUMENTS

| | | | | |
|---|---|---|---|---|
| 4,559,832 A | * | 12/1985 | Burlage | G01F 1/3254 310/338 |
| 4,951,915 A | | 8/1990 | Piao | |
| 5,000,224 A | * | 3/1991 | Olson, Jr. | F16K 31/402 137/487.5 |
| 5,370,029 A | * | 12/1994 | Kramer | H01F 7/14 251/129.2 |
| 5,439,021 A | * | 8/1995 | Burlage | F15B 13/0405 137/269 |
| 6,341,622 B1 | * | 1/2002 | McHugh | A62C 37/50 137/523 |
| 7,392,817 B2 | * | 7/2008 | Burlage | F17D 5/06 137/1 |
| 7,509,975 B2 | * | 3/2009 | Hodge | G05D 7/0635 137/456 |
| 2001/0003286 A1 | * | 6/2001 | Philippbar | G01M 3/243 137/624.12 |
| 2002/0017324 A1 | | 2/2002 | Hisamura et al. | |
| 2008/0142098 A1 | | 6/2008 | Burlage et al. | |
| 2013/0048549 A1 | * | 2/2013 | Burrows | B01D 61/04 210/232 |
| 2013/0193160 A1 | * | 8/2013 | Hammonds | G01F 3/16 222/63 |

FOREIGN PATENT DOCUMENTS

| | | |
|---|---|---|
| EP | 2700757 A2 | 2/2014 |
| JP | 0942507 A | 2/1997 |
| WO | 9201980 A1 | 2/1992 |
| WO | 9706377 A1 | 2/1997 |
| WO | 2008046042 A1 | 4/2008 |
| WO | 2010056111 A1 | 5/2010 |

* cited by examiner

WATER SAFETY SHUT-OFF VALVE

BACKGROUND OF THE INVENTION

The present invention relates to a water conservation safety shut-off valve.

Water usage and conservation is widely studied and many articles are written about ways for consumers and industry to conserve water. The proposed solutions generally fall into two categories: (1) behavioral and (2) engineered. Behavioral solutions are generally human responses to situations to conserve water, such as turning off the water faucet while brushing teeth. Most of the engineered solutions presented are plumbing solutions aimed at restricting consumption of water; these include items like "low-flush toilets, "toilet displacement devices," "low-flow showerheads," and "faucets aerators." Yet, the question still remains as to what is the most important thing an individual can do to reduce water usage in the home.

A simple answer is to identify and repair toilet leaks. The toilet tank is probably the most neglected plumbing fixture in a home. As valves and refill ball cocks age, they tend to leak. Flappers will deteriorate over time with exposure to water. Eventually, they begin a slow but constant seepage. Often, they silently leak away thousands of gallons of potable water before they are detected. Similarly, ball cocks will weaken with age and fail to shut-off after the tank is full, resulting in water slowly pouring over the top of the tanks overflow tube. Periodically, valves and ball cocks should be replaced as part of the routine maintenance of all plumbing in the home. A 1984 study by the U.S. Department of Housing and Urban Development reported that 20% of all toilets leak. Most leaks occur when water leaks from the tank into the bowl through flapper valves, valve seats, and overflow tubes, which often go unnoticed and unheard.

Despite attempts to conserve water, the undetected leaks account for inadvertent loss of water resources and can account for thousands of gallons of water lost in as much as 20% of all homes. All engineered solutions, sooner or later, succumb to behavioral solutions that require human intervention with inspection and repair. Thus, no engineered solutions exist to intervene when excessive water usage is detected.

Thus, in view of the foregoing, the primary feature or advantage of the present invention is to provide a water conservation safety shut-off valve which addresses one or more of the foregoing problems.

Another feature or advantage of the present invention is a water conservation safety shut-off valve which can be easily attached to existing appliances, such as toilets.

Another feature or advantage of the present invention is a water conservation safety shut-off valve which resets itself under normal use, but times out and closes under abnormal extended use.

Another feature or advantage of the present invention is a water conservation safety shut-off valve which indicates to a user when there is a problem with water usage through the valve.

Another feature or advantage of the present invention is a water conservation safety shut-off valve which is easily resettable by a user.

Another feature or advantage of the present invention is a water conservation safety shut-off valve which is economical to manufacture, durable in use, and efficient in operation.

Another feature or advantage of the present invention is a method of reducing water loss through leaky appliances using a water conservation safety shut-off valve.

One or more of these and/or other features or advantages will become apparent to one of ordinary skill in the art as described in the specification and claims that follow.

BRIEF DESCRIPTION OF THE INVENTION

One or more of the foregoing features or advantages may be accomplished by a fluid or water shut-off valve assembly and method where the valve assembly has a valve body with a fluid passageway and, for example, at least a portion of the fluid passageway is sensor monitored for flow detection. A valve stem has a valve plug moveable between an open position and a closed position. A cam lever has a radially graduated profile that the valve stem is configured to follow. A flow detection device has a moveable member within the portion of the fluid passageway monitored by a sensor for detecting displacement of the moveable member and thereby flow of fluid through the passageway.

One or more of the foregoing features or advantages may be accomplished by a water conservation safety shut-off valve having an electrical generating system for generating electricity using energy of the water passing through the valve to turn a shaft on a small electrical generator. The valve assembly may have electronics to store the electrical energy generated.

One or more of the foregoing features or advantages may be accomplished by a water conservation safety shut-off valve having a lever indicator for indicating whether the valve plug is opened or closed.

One of more of the foregoing features or advantages of the present invention may be accomplished by a fluid shut-off valve assembly that has a valve body with a fluid passageway. A fluid ram is disposed within the fluid passageway. The fluid ram is moveable between first and second positions within the fluid passageway. A fluid ram detector is disposed external to the fluid passageway. The detector has a flux path extending into the fluid passageway for detecting the first or second position of the fluid ram within the fluid passageway. A timing circuit has a timer that is activated by detecting the fluid ram in the first or second position within the fluid passageway.

One or more of the foregoing features or advantages of the present invention may be accomplished by a water conservation safety shut-off valve which resets the timer to a zero value when water flowing through the valve stops.

One or more of the foregoing features or advantages additionally may be accomplished by a method for a fluid shut-off valve assembly that includes a valve body having a fluid passageway. Fluid flow through the passageway is detected, for example, by monitoring displacement of a component within the fluid passageway. A timer is started upon detecting displacement of the component and a valve plug is actuated for closing the fluid passageway when the timer elapses.

DETAILED DESCRIPTION OF THE PREFERRED EMBODIMENT

The present invention is a water conservation safety shut-off valve and method.

Figure 1:
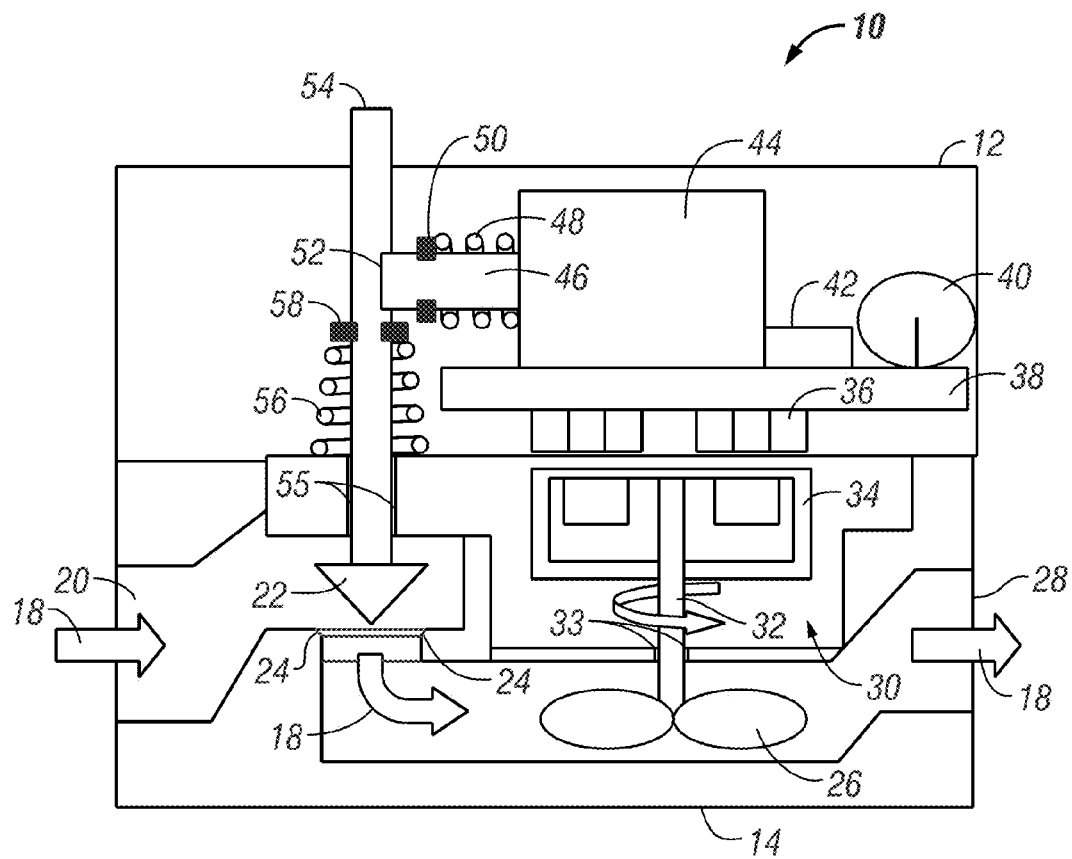
FIG. 1 is a cutaway side view of one embodiment of the water conservation safety shut-off valve of the present invention.

FIG. 1 shows a water conservation safety shut-off valve assembly 10 of the present invention. The valve assembly 10 has a cover 12 for containing and protecting parts of the valve assembly 10 used in connection with the valve body 14.

The valve body 14 can be constructed from any material capable of allowing water or other fluids to flow through the valve body 14. However, it is preferred that the valve body 14 be constructed from plastic, brass, or other substances which have low risk of rust, corrosion, etc.

There is a water flow path 18 through the valve body 14 as indicated by the arrows showing the water flow path 18. The water flow path 18 can be any shape or direction through the valve body 14 and can be any size depending on the need or volume of water which is to flow through the valve assembly 10. Water enters the valve assembly 10 at the water inlet connection 20 of the water flow path 18, flows past a valve plug 22, and through a valve seat 24, past a water flow detection device, such as a flow ram, an impeller or blade 26, and out the water outlet connection 28 of the water flow path 18.

The water inlet connection 20 and the water outlet connection 28 can be adapted to connect with any desirable plumbing fixture or use. For example, the inlet 20 and outlet 28 can be adapted to connect to a standard household plumbing supply line so that the valve assembly 10 can be used with toilets, faucets, ice makers, etc. Additionally, the inlet 20 and outlet 28 can be adapted to be used with other plumbing devices, such as garden hoses, so that the valve assembly 10 can be used to automatically time usage of water and close the valve assembly 10, stopping the flow of water through the flow path 18 when attached to a lawn sprinkler. In other words, the valve assembly 10 can be adapted to connect with or fit to any desirable use or appliance.

The body head assembly 30 holds the impeller shaft 32. The impeller shaft 32 is attached to the impeller or blade 26. The impeller or blade 26 can be any shape or configuration, such as an impeller, blade, squirrel cage, etc, but will be called impeller for simplicity. As water flows through the water path 18, the pressure and flow of the water rotates the impeller 26. Seals 33 surround the impeller shaft 32 keeping the water inside the water flow path 18 and allowing the impeller shaft 32 to rotate outside of the water flow path 18 and within the body head assembly 30. The direction of rotation of the impeller 26 and the impeller shaft 32 is not critical. Such a configuration may be arranged to detect the flow of water through water flow path 18 as previously indicated or may be arranged to generate electricity by rotation of impeller shaft 32. In at least one embodiment, a sensor circuit 150, such as the one illustrated pictorially in FIGS. 7A-7B, may be configured as a separate component or as an integral component of the valve assembly 10. In the case where the sensor circuit 150 is a separate component, the sensor circuit 150 may be configured to attach to the valve body 14 using one or more water flow path fittings (e.g., copper, PVC, cross-linked polyethylene, commonly abbreviated as PEX or XLPE, or other like water flow path conduit materials). In the case where the sensor circuit 150 is integrated with the valve body 14, the sensor circuit 150 may be housed within the valve body and in communication with water flow path 18. In one example, the impeller or blade 26 assembly may be replaced with the sensor circuit 150 pictorially represented in FIGS. 7A-7B.

As is discussed in more detail later in the description, the sensor circuit 150 includes a chamber 148 in communication with an inlet 144 and an outlet 128. At least one portion of the chamber 148 has a ram 142 disposed therein. The ram 142 may be configured of various types of material suitable for use within an environment that includes the flow of water therethrough. In one aspect, the ram 142 may be composed of one or more ferrous types materials. The one or more ferrous types of materials may make up the bulk constituent or an additive to another bulk constituent. In a preferred aspect, the ram 142 is comprised of one or more magnetically sensitive materials. In at least one operation of the sensor circuit 150 the ram 142 is seated within the inlet 144 against the ram seat 162. Water flow through the chamber 148 must first pass through the inlet 144. The diameters of the inlet 144 and the ram 142 are sized so that the ram 142 is forced to move when water flow is greater than a prescribed value (e.g., volumetric flow). Thus, water passing through the water flow path 18, according to at least one embodiment, passes through inlet 144 of the sensor circuit 150. For the water to pass through the inlet 144 into the chamber 148, the ram 142 is moved out of the inlet 144 off of the ram seat 162 by the water flow.

Movement of the ram away from the inlet 144 off of the ram seat 162 displaces the ram 142 into the flux path 160 generated by coil 158 encircling at least a portion of the chamber 148. As the ram 142 is displaced from the inlet 144 into the flux path 160 of coil 158 the inductance of the coil 158 changes. Sensor circuit 150 detects the change in the inductance of the coil 158 as the ram 142 is displaced into the flux path 160 as pictorially represented in FIG. 7B. Water passing through the inlet 144 to the body 148 of the sensor circuit 150 may pass through the outlet 128 which also may be connected in fluid communication with the water flow path 18. In one aspect, the circuit board 38, pictorially represented in FIG. 1, may be electrically connected to the sensor circuit 150 to monitor the status of the coil 158, specifically the change in inductance of the coil 158. The circuit board 38 may be electrically powered via a power outlet, an electrochemical cell, solar cell or the like.

In the event water flows into or through the chamber 148, the ram 142 moves into the flux path 160 changing the inductance of the coil 158 thereby triggering a timer in, for example, a timing circuit 42. The valve assembly may be configured whereby a user sets the duration of the timer in at least one aspect of the present invention. In another aspect, the timer may be programmed during manufacturing with certain (e.g., preprogrammed) time increments or settings for timing the duration of flow through the sensor circuit 150. In any event, if water flow is detected by the sensor circuit 150, the timing circuit 42 starts a timer to time the duration of water flow through the sensor circuit 150. If water flow stops at any time during the set period or prescribed time limit of the timing circuit 42, the timing circuit 42 resets. For example, the timing circuit 42 may be programmed by the user or manufacturer with a prescribed time increment or period that upon sensor circuit 150 detecting water flow into or through chamber 148 starts the timing circuit 42. In a further example, the timing circuit 42 may be configured, for example, at a 1 minute, 2 minute, 3 minute, etc. time duration and upon sensor circuit 150 detecting liquid flow starts counting down from the prescribed time setting. If prior to the time limit elapsing, the liquid flow stops the timer may be reset. If the prescribed time limit lapses and the sensor circuit 150 detects water flow the water flow path 18 may be blocked thereby preventing water flow through the water flow path 18 using, for example, the valve plug 22 and valve seat 24 pictorially represented in FIG. 1 or the valve plug 122 and valve seat 124 pictorially represented in FIGS. 5A-5B. In the case where valve plug 122 and valve seat 124 are configured within the valve assembly 10, the valve plug 122 is closed by seating against the valve seat 124 when the timing circuit 42 reaches the prescribed time limit. Thus, the valve plug 122 and valve seat 124 may be configured within the water flow path 18, preferably before the sensor circuit 150 similar to the valve plug 22 and valve seat 24 illustrated pictorially in FIG. 1. With either configuration, upon the timing circuit 42 reaching a prescribed time limit the valve plug 22 or valve plug 122 may be permitted to move from an open position to a closed position preventing water flow through the water flow path 18. According to at least one example, as pictorially represented in FIGS. 5A-5B, the valve plug 122 may be actuated from an open to a closed position using a magnetic circuit 130 as discussed in more detail herein.

The flow sensor attaches to a printed wiring assembly or printed circuit board 38. The printed circuit board 38 is located separate from the valve body 14 to avoid any contact with water or fluid flowing through the valve and is preferably located inside the cover 12 to protect from dust and electrical shock.

In the embodiment of FIG. 1, a timing circuit 42 may be incorporated onto the printed circuit board 38. The timing circuit 42 checks for rotation of the impeller 26, meaning that water or fluid is flowing through the flow path 18 by determining that the rotor 34 is rotating and generating electricity. The timing circuit may also be configured to start a timer upon rotation of the rotor 34 in one aspect or upon detection of a change in the inductance of the sensor circuit 150. One reason for the timing circuit is to determine the duration or length of time water or fluid has been traveling through the flow path 18. Used in this way, the time or duration calculated by the timing circuit 42 can determine if water or fluid has been traveling through the flow path 18 greater than a predetermined duration of time which would indicate abnormal operation and possibly a leak in downstream appliances. On the other hand, if the valve assembly 10 is used on a yard sprinkler or the like, a time out of the timer 42 simply indicates the desired duration of use has elapsed.

Figure 6A:
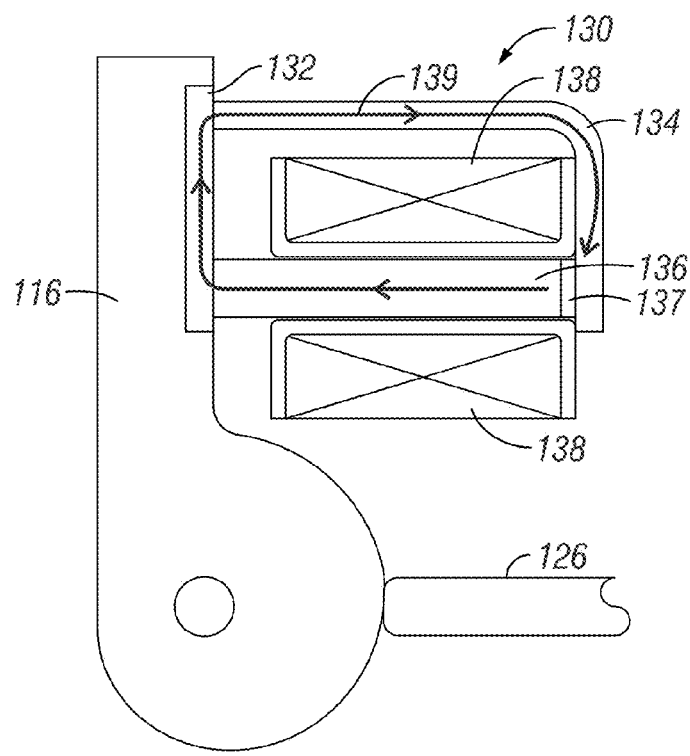
FIG. 6A is a pictorial representation of a magnetic circuit in accordance with an illustrative embodiment.
Figure 6B:
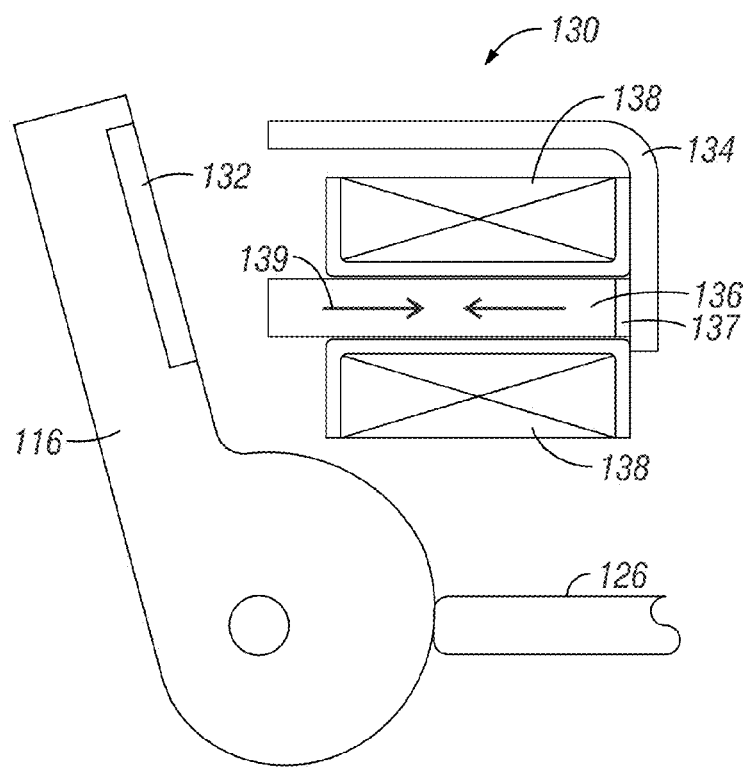
FIG. 6B is a pictorial representation of the circuit in FIG. 6A in accordance with another illustrative embodiment.

Once the timing circuit 42 determines that the duration or time of water flowing through the flow path 18 is greater than the predetermined value, the timing circuit 42 initiates a transfer of electrical energy from the storage capacitor or battery 40 to an electrical solenoid 44 or a magnetic circuit 130 (see FIGS. 6A-6B). As pictorially illustrated in FIG. 1, the solenoid 44 is a standard solenoid having a plunger 46 which travels linearly back and forth. A solenoid plunger spring 48 is held in place around the solenoid plunger 46 between a casing for the solenoid 44 and the solenoid plunger spring keeper ring 50. The solenoid plunger spring 48 keeps biasing pressure on the solenoid plunger 46 to maintain an outer-most traveled position when the solenoid 44 is not electrically energized. Once the solenoid 44 is energized electrically, the magnetism created within the solenoid 44 pulls the solenoid plunger 46 toward the solenoid 44 body against the biasing pressure of the solenoid plunger spring 48. Then, once the electrical energy is no longer energizing the solenoid 44 coils, the solenoid plunger 46 then travels back outward with the biasing force of the solenoid plunger spring 48.

Figure 5A:
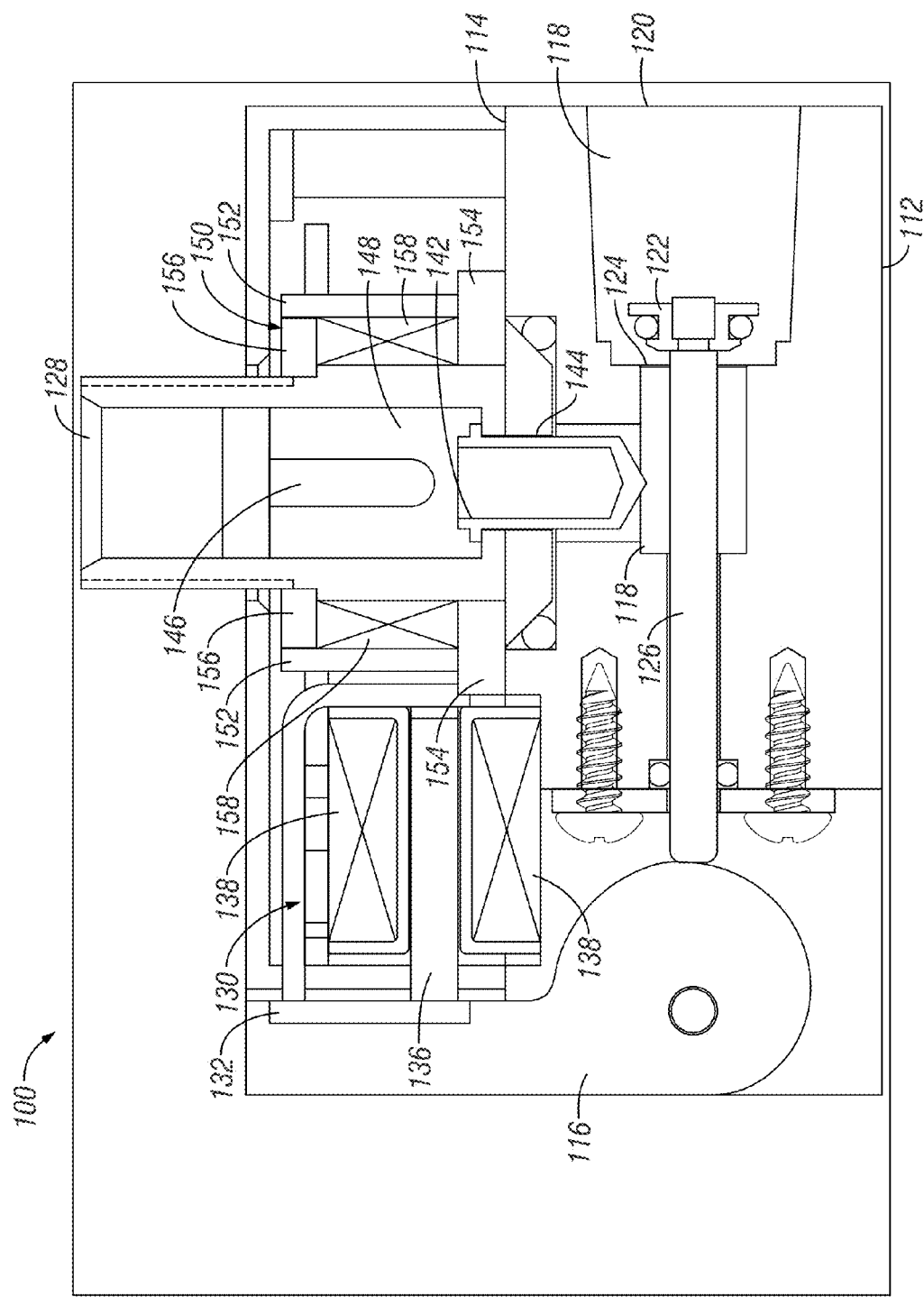
FIG. 5A is a pictorial representation of a cutaway side view of another water conservation safety shut-off valve in accordance with an illustrative embodiment.
Figure 5B:
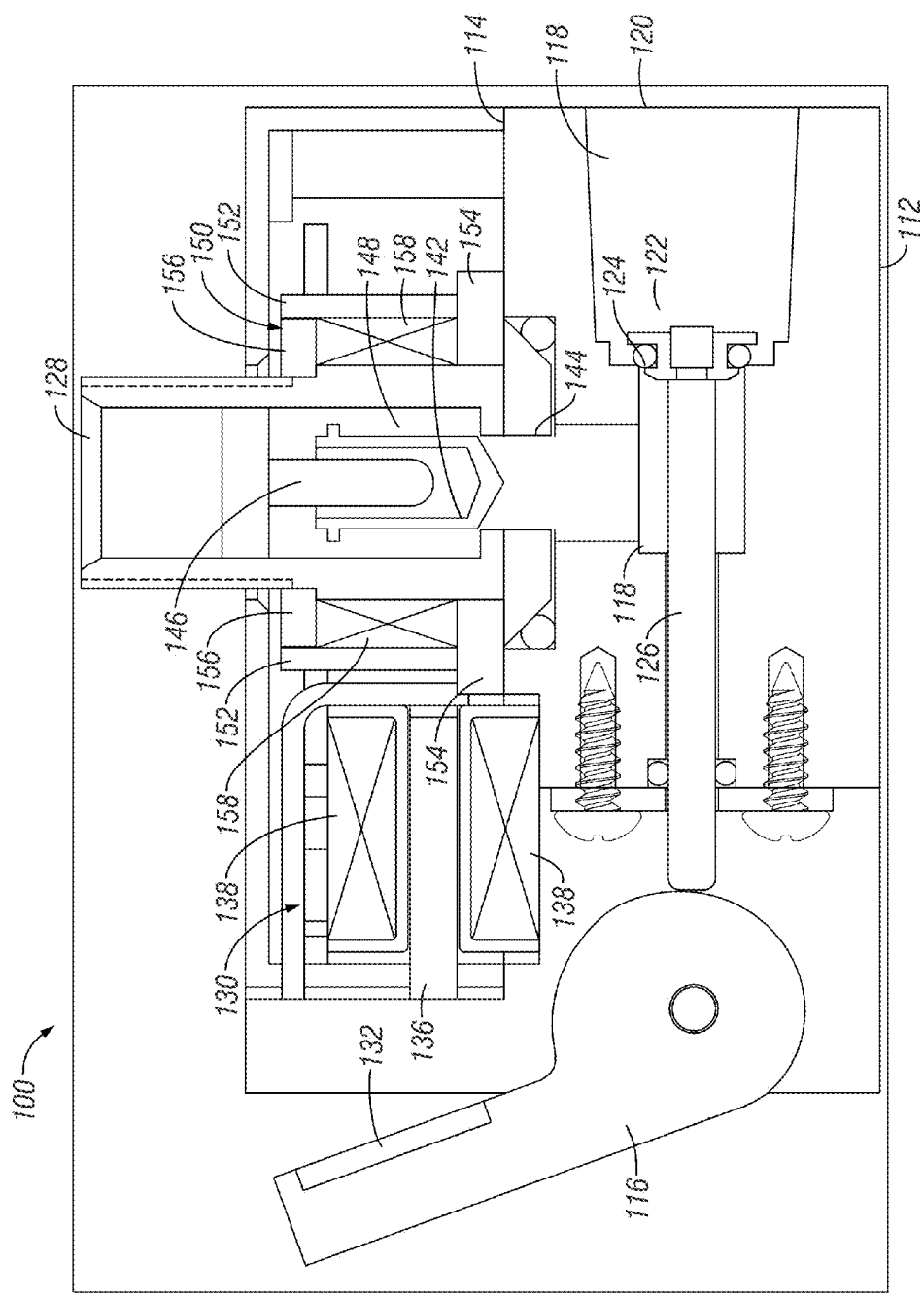
FIG. 5B is a pictorial representation of the valve in FIG. 5A in accordance with another illustrative embodiment.

The solenoid plunger 46 engages a detent or catch 52 in the valve stem 54 of the valve plug 22. Having the solenoid plunger 46 engage the detent 52 on the valve stem 54 causes the valve stem 54 and corresponding valve plug 22 to be held into position until the solenoid 44 is energized, pulling the solenoid plunger 46 away from the valve stem 54 and out of the valve stem detent 52. In another aspect, such as pictorially represented in FIGS. 5A-6B, energizing coil 138 releases cam lever 116. The cam lever 116 may be biased (e.g., to rotate from an "valve open" position to a "valve closed" position) using the cam shaped portion engaging the valve stem 126 or spring biased to rotate to allow the valve stem 126 to close on the valve seat 124 upon energizing coil 138. For example, FIGS. 5A-5B provide exemplary illustrations of the cam lever 116 in a position where the valve stem 126 is closed (see FIG. 5B) and a position where the valve stem 126 is open (see FIG. 5A).

As pictorially represented in FIG. 1, the valve stem 54 and valve plug 22 travel linearly through the valve body 14, the body head assembly 30, and cover 12. Having the valve stem 54 extend through the cover 12 allows for the valve stem 54 to indicate whether the valve plug is in an open or closed position with respect to the valve seat 24 and a flow path 18. If the valve stem 54 is lower with respect to a cover 12, the valve plug is mating with the valve seat 24 and thereby closing off the flow path 18. A user can then simply pull upward on the valve stem or trip indicator 54 until the valve plug 22 disengages the valve seat 24 and the detent 52 mates with the solenoid plunger 46 again holding the valve stem 54 and valve plug 22 in an open position allowing water or fluid to again flow through the flow path 18. In addition to the valve stem or trip indicator 54 indicating open or closed position of the valve plug 22, a signal can be generated by the electronics on the circuit board 38 to operate a light, buzzer, or other type of trip indicator (not shown). Similarly, as pictorially represented in FIGS. 5A-5B, the cam lever 116 may be positioned to indicate when the valve assembly has been "tripped" and to allow the cam lever 116 to be actuated back to an "untripped" position. For example, the position of the cam lever 116 in FIG. 5B may serve as an indicator that the valve stem 126 is in a closed position. Conversely, the position of the cam lever 116 in FIG. 5A, for example, indicates that the valve stem 126 is in an open position. The cam lever 116 may be manually moved between positions, and preferably from the cam lever 116 open position shown in FIG. 5B to the cam lever 116 closed position shown in FIG. 5A. Other visible cues, indicators or signals, as discussed above, may be used to indicate the status of the valve assembly 10. In both instances, the valves are simple sliding stem designs. The valve plug may be unbalanced so the water pressure on the inlet side of the plug (e.g., 22, 122) assists in closing it. A spring may also be used to bias the valve plug closed. The spring (e.g., compression/tension, extension, etc.) may be configured in either compression or expansion (e.g., see FIG. 1) to bias the valve plug closed when not otherwise held open by, for example, plunger 46 or cam lever 116.

To keep the water flowing through the flow path 18, a seal or seals 55 are located in the body head assembly 30, allowing the valve stem 54 to travel linearly, but not allowing water to leak through the seal 55. The valve stem 126 is configured with similar seal arrangements. In FIG. 1, the valve stem 54 is biased towards a downward position, or towards the valve seat 24 by the valve stem spring 56 and the valve stem spring keeper ring 58. In this configuration, shown in FIG. 1, the valve stem spring 56 is a tension spring held between the body head assembly 30 and the valve stem spring keeper ring 58 and pulling downward on the valve stem 54. Therefore, in the relaxed position, the valve stem 54 is in its downward most position so that the valve plug 22 can sealably mate with the valve seat 24 to close the flow path 18. Although not shown, the valve plug 126 may be spring biased toward a closed position (see FIG. 5B) in a similar manner.

Figure 2:
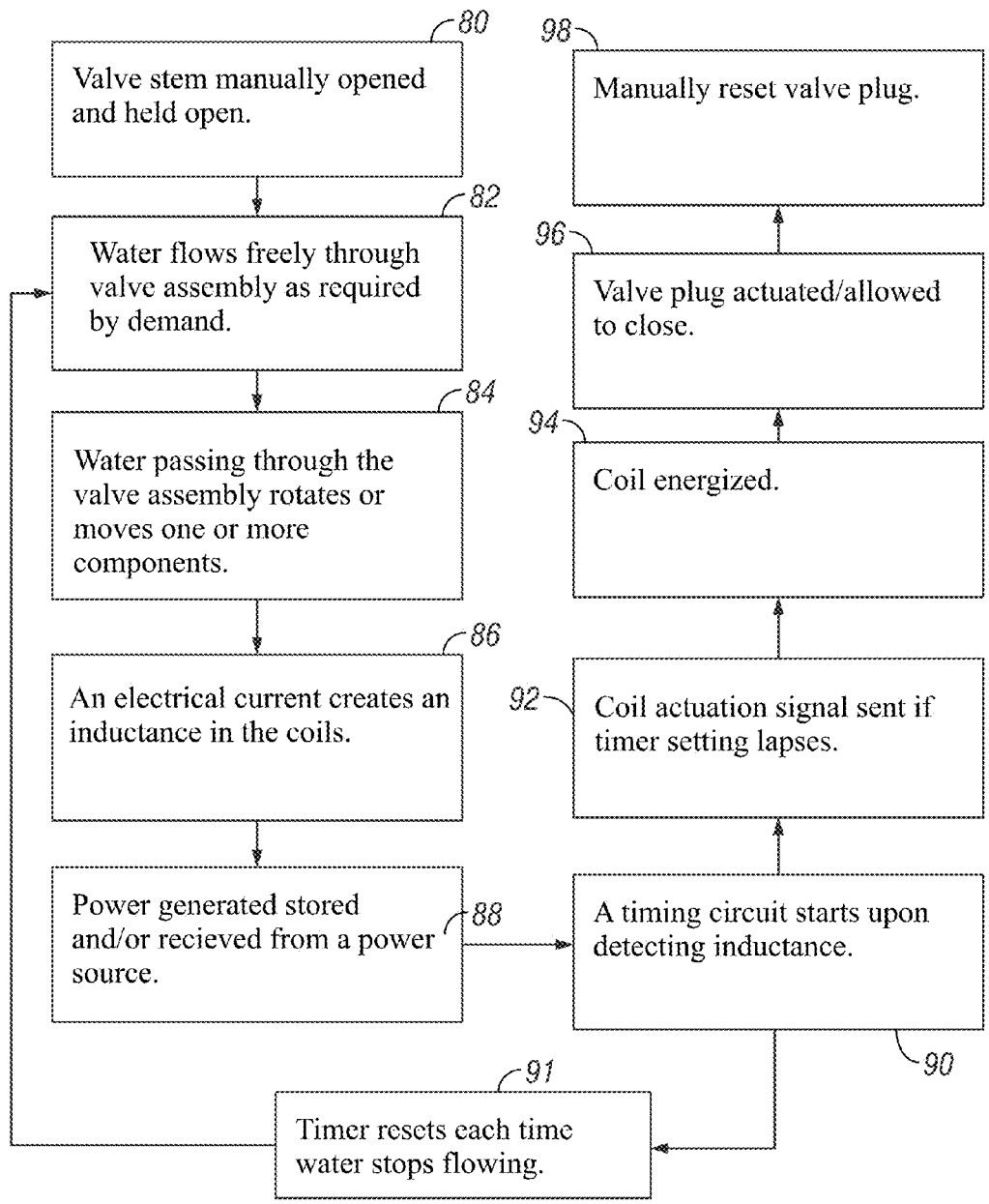
FIG. 2 is a flow chart showing steps of operation for the water safety shut-off valve of FIG. 1.

FIG. 2 is a pictorial representation of a flow chart of the operation of the valve assembly 10. The valve assembly 10 is connected at the inlet 20 and outlet 28 to a standard plumbing system. In one aspect as taught at 80, the valve stem 54 is manually raised against the biasing spring 56 allowing the solenoid plunger 46 to engage the detent 52 in the valve stem 54. In another aspect as taught at 80, a cam lever 116 is manually moved from the cam lever 116 open position shown in FIG. 5B to the cam lever 116 closed position shown in FIG. 5A. The valve stem 126 is held in the open position (see FIG. 5A) by the cam lever 116 being in the cam lever 116 closed position. At 82, the water or other fluid flows freely through the valve assembly 10 as is required by demand of the appliance or other device connected at the outlet 28 of the valve assembly 10. At 84, according to one detailed embodiment, water or other fluid moves through the interior passage or pathway 18 rotating the impeller 26 and impeller shaft 32. Alternative to rotating one or more components, water passing through the valve assembly may be used to move one or more components, such as by displacing ram 142. Also at 84, in at least one aspect, the rotating impeller shaft 32 rotates permanent magnets attached to the impeller shaft 32 to form a rotor portion of a power generating system. According to one aspect of Step 86, a sensor circuit 150 monitors movement of one or more components with a fluid passageway. For example, a component such as a ram 142 may be displaced within a fluid passageway by fluid flow through the passageway for detecting fluid flow using a sensor such as sensor circuit 150 (see Step 88). In one aspect, sensing by sensor circuit 150 occurs when the movement of the ram 142 causes a change in the inductance of coil 158. As taught in at least one aspect of the present disclosure, a generating system 34, 36 may be configured to generate electricity from movement of one or more components within the fluid passageway by inducing an electrical current through the windings of the stator 36 by the changing poles of the permanent magnets of the rotor 34. In another aspect, electrical energy may be stored aboard the valve assembly in an electrochemical cell (e.g., battery) or capacitor 40. The valve assembly 10 may be powered, at least in part, by an electrical outlet. Onboard power sources (e.g., electrochemical, capacitor, or otherwise) may be charged by the process of moving one or more components (e.g., shaft 32) or by a solar or electrical source (e.g., electrical outlet). Step 90 teaches generally the starting of a timing sequence upon detecting an inductance. According to one specific aspect of Step 90, once the timing circuit 42 detects electricity is being generated, indicating that water or fluid is flowing through the flow path 18, the timing circuit 42 begins timing a duration that the water or fluid is flowing through the flow path 18. In another aspect of Step 90, the timing circuit 42 is activated by a change in the inductance of the sensor circuit 150. Each time the water flow stops, the circuit timer 42 is reset to a value of zero as shown at 91. If the water flow does not stop and the time on the timer elapses, a coil actuation signal is sent at Step 92. In one aspect, Step 92 may be configured so that when the timing circuit reaches a preset or user adjustable timer setting value, the timing circuit 42 initiates sending of an electrical signal to operate the solenoid 44. In another aspect, Step 92 may be configured whereby the change in the inductance of the sensor circuit 150 causes a coil actuation signal to be sent to the magnetic circuit 130. The valve assembly 10 is preferably set up so that a user may adjust the timer circuit 42 to suit the application in which the valve assembly 10 is used. Once the solenoid 44 or magnetic circuit 130 is energized in Step 94, the valve plug 22, 122 is actuated/allowed to move from an open to closed position in Step 96. In one example, the solenoid plunger 46 pulls away from the valve stem 54 and out of the detent 52. The valve stem 54 and attached valve plug 22 move once the solenoid plunger disengages the detent 54 using the biasing force supplied by the valve stem spring 56 to seat the valve plug 22 firmly against the valve seat 24 to stop the flow of water or fluid through the flow path 18 of the valve assembly 10. In another example, a cam lever 116 is released upon coil 138 being energized thereby allowing valve plug 122 to close. In either case, the "tripped" valve plug 22, 122 may be manually reset as taught in Step 98. In one aspect, the valve assembly 10 can be manually reset by pulling upward on the valve stem or trip indicator 54 after the timing circuit 42 reaches a value exceeding a preset user defined time limit. In another aspect, cam lever 116 may be manually moved to the closed position thereby moving valve plug 122 back to the open position (see FIG. 5A)

It is understood, however, that many different steps or combination of steps adding or deleting from those shown in FIG. 2 can be used to control and operate the valve assembly 10, whether alone or in combination with one or more components illustrated in the other Figures.

Tests on a prototype of the valve assembly 10 shown in FIG. 1 indicate that there is a proportional relationship between volumetric flow rate and the rate of rotation of the shaft 32 or rate of movement for the ram 142. For example, in one aspect the electricity generated may be used to determine the flow rate of water through the valve assembly 10. In addition, the valve assembly 10 can be configured so that the valve plug 22, 122 will trip or close after a predetermined volume of fluid has passed through the flow path 18. Since the generated electricity is proportional to the flow rate, the electronics on the pc board 38 and the timing circuit 42 can calculate volume of liquid through the valve assembly 10 and close the flow path 18 after the predetermined volume has passed through the valve assembly 10. For example, the valve plug 22, 122 can be set to close after 500 gallons of water or fluid has passed through the valve assembly 10. The desired volume set point is adjustable for different volumes.

Figure 3:
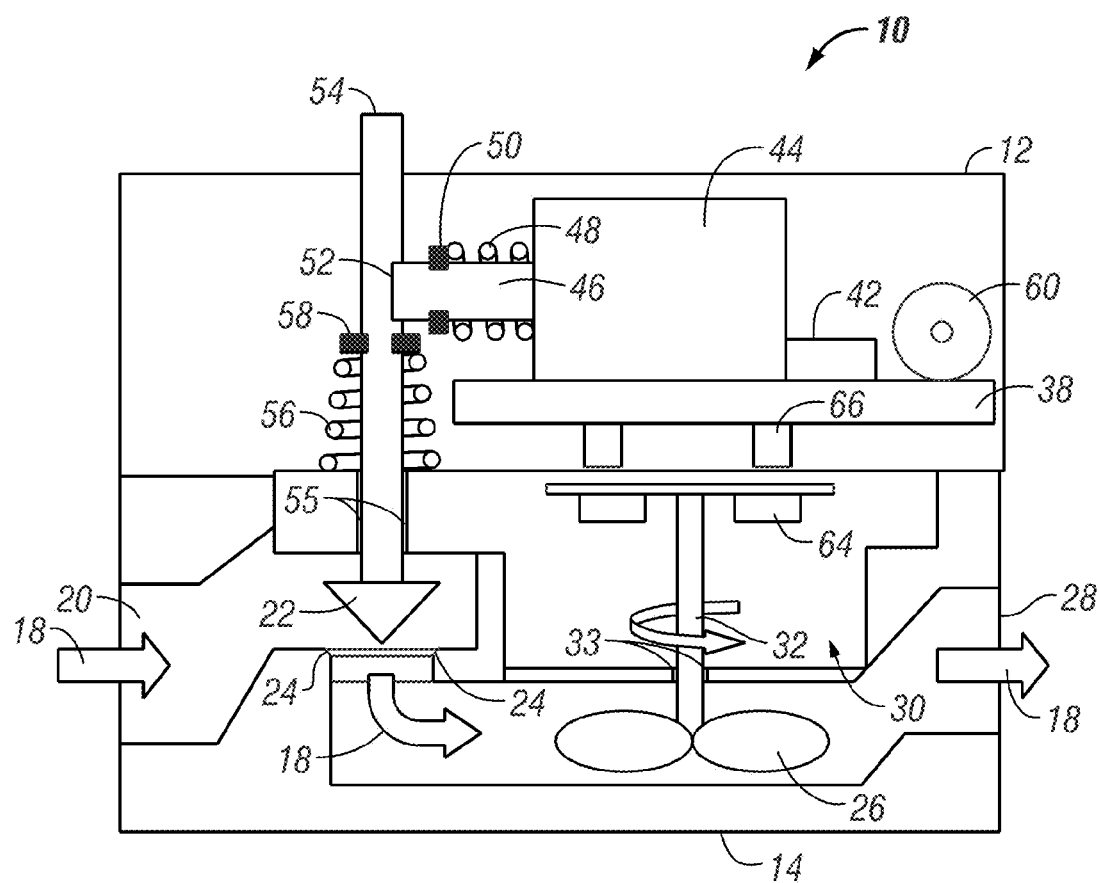
FIG. 3 shows a cutaway side view of another embodiment of a water conservation safety shut-off valve.
Figure 4:
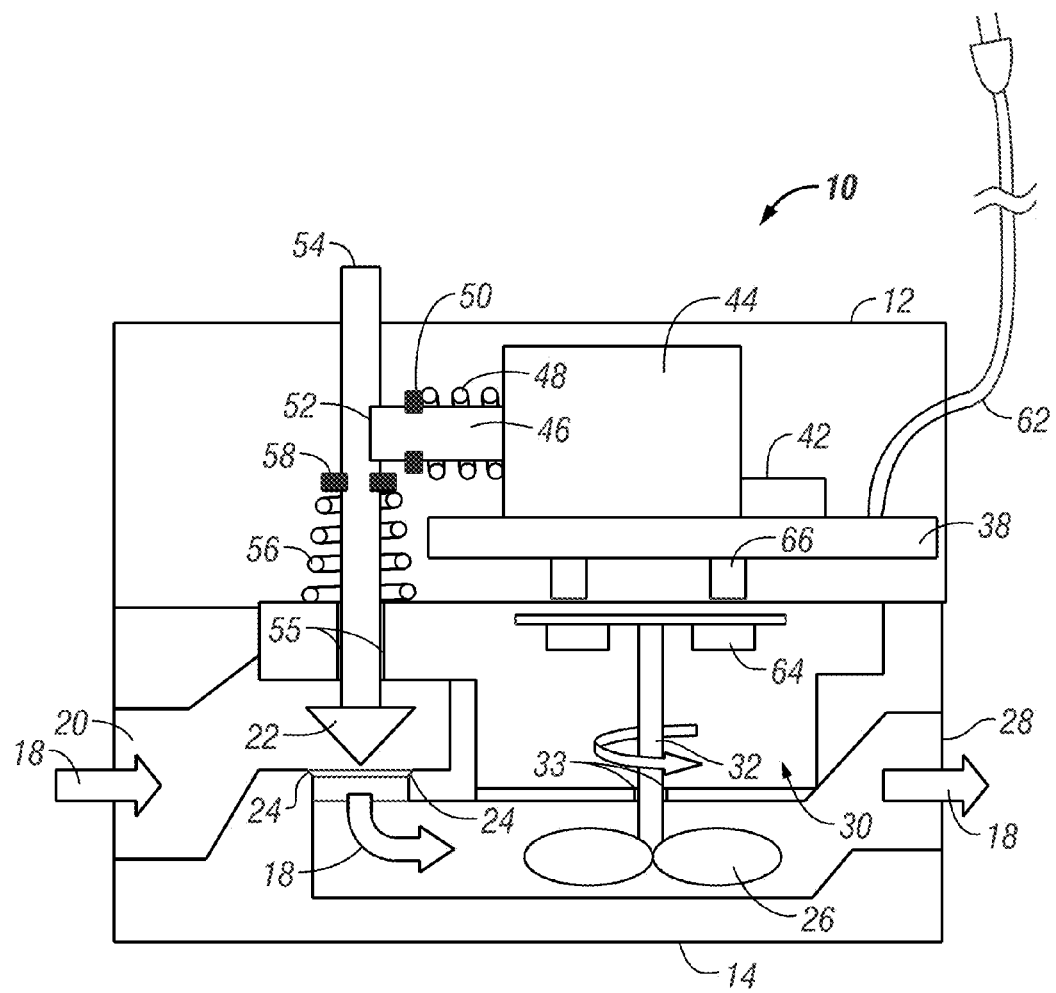
FIG. 4 shows a cutaway side view of still another embodiment of a water conservation safety shut-off valve.

Other embodiments of a water conservation safety shut-off valve assembly 10 are shown in FIGS. 3 and 4. These embodiments work essentially the same as described above. FIG. 3 has a standard battery electrically connected to the printed circuit board 38 for powering the electronics on the printed circuit board 38. The detection of water flowing through the flow path 18 in the valve assembly of FIG. 3 is conducted using motion sensors 64, 66 attached to the impeller shaft 32 and the printed circuit board 38, respectively. These sensors 64, 66 can be magnetic sensors, optical sensors, or any other type of motion sensing sensor. In other words, the flow through the flow path 18 is detected in the embodiment shown in FIGS. 3 and 4 using motion sensors 64, 66 and not using electricity generated through a rotor 34 and stator 36. Similarly, sensors 64, 66 could be configured to monitor movement of ram 142 shown, for example, in FIGS. 7A-7B. Thus, the valve assembly 10 in FIGS. 3 and 4 could be configured with a sensor circuit 150 whereby flow through the water flow path 18 is detected by the one or more sensors 64, 66 detecting movement of the ram 142 as water passes through the inlet 144 causing movement of the ram 142.

Another embodiment of the water conservation safety shut-off valve assembly 10 is shown in FIG. 4 having an electrical power cord 62 attached to the printed circuit board 38 for powering the electronics on board the printed circuit board 38 and operating the valve assembly 10. The valve assembly 10 shown in FIG. 4 operates similarly to the valve assemblies 10 described previously. In addition, the detection of water flowing through the flow path 18 may be accomplished as previously described.

FIG. 5A-5B disclose a valve assembly 100 in accordance with one or more aspects of the present invention. The valve assembly 100, as discussed previously, may be included with one or more of the valve assemblies 10 included herein. For example, the valve assembly 100 may be included or disposed within assembly 10 illustrated in the figures. Valve assembly 100 may also include an inlet 120 and an outlet 128 configured to be connected to a standard plumbing system. Thus, the valve assembly 100 may be used separately or in combination with one of the aforementioned valve assemblies 10. The valve assembly 100 includes a cover 112 within which one or more components of the valve assembly 100 may be disposed. For example, a valve body 114 may be included within the cover 112. Passing through the valve body 114 is a flow path 118 having an inlet 120 and an outlet 128. The flow path 118 is configured for passing water therethrough. The inlet 120 and outlet 128 may include one or more fittings for attaching the valve assembly 100 to existing plumbing (e.g., residential, commercial, or otherwise), garden hoses or other like water carrying conduits. A valve seat 124 is configured within the flow path 118. At least a portion of a valve plug 122 is disposed within the flow path 118 to interact with the valve seat 124. The valve plug 122 includes a valve stem 126 having one end configured to carry the valve plug 122 and an opposite end configured to follow the curvature of the cam lever 116. One or more seals may be included around the valve stem 126 to seal the interface between the valve body 114 and the valve stem 126. Additionally, one or more gaskets may be included on the valve plug 122 for interfacing with the valve seat 124.

Figure 7A:
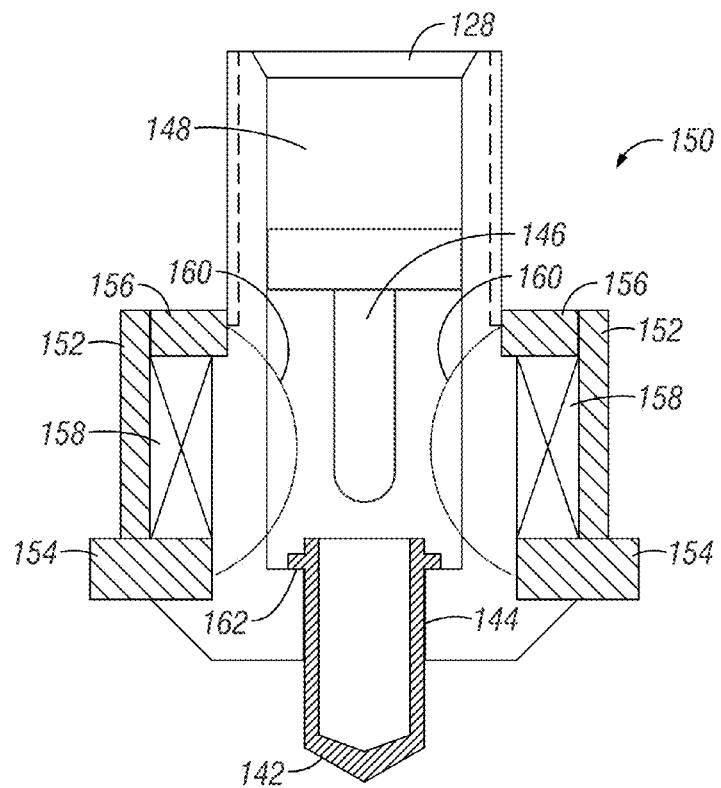
FIG. 7A is a pictorial representation of a sensor circuit in accordance with an illustrative embodiment.
Figure 7B:
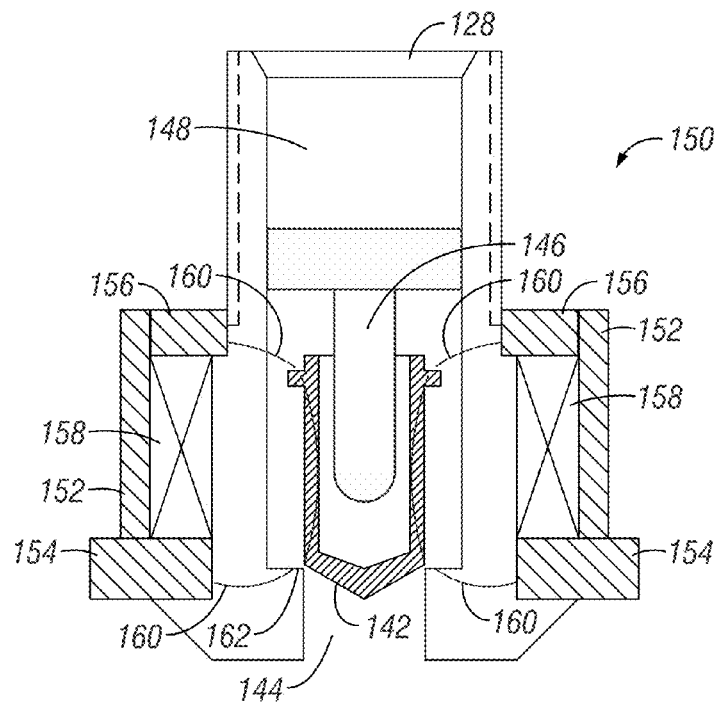
FIG. 7B is a pictorial representation of the circuit in FIG. 7A in accordance with another illustrative embodiment.

The valve body 114 also includes a sensor circuit 150, also illustrated in FIGS. 7A-7B, that includes an inlet 144 operably configured to house a ram 142. The inlet 144 to the sensor circuit 150 is disposed in the flow path 118 so as to be in fluid communication with the inlet 120. The sensor circuit 150 also includes a chamber 148 within which the ram 142 is operably disposed for movement in and out of the inlet 144, seating and unseating from the ram seat 162. One or more elements may be disposed within the chamber 148, such as a guide 146, for operably engaging the ram 142 during movement of the ram 142. The flow path 118 also includes an outlet 128 for passing water through the sensor circuit 150. Operably disposed about the outer circumference of the chamber 148 of the sensor circuit 150 is a coil 158. Coil 158 may include one or more elements 152, 154 and 156 may be comprised of one or more nonconductive materials for shielding the coil 158.

Also included in the valve body 114 is a magnetic circuit 130. The magnet circuit 130 and the sensor circuit 150 may be connected in operable communication with circuit board 38 previously illustrated. Magnetic circuit 130 includes one or more magnetically conductive materials 132, 134, and 136 configured in combination with a magnetic source 137 (e.g., a permanent magnet such as a neodymium magnet) to provide a magnetic circuit 132, 134, 136, and 137. At least one of the magnetically conductive materials 136 is disposed between coil 138. Cam lever 116 includes a magnetically conductive material 132 comprising part of the magnetic circuit. FIG. 5A illustrates the cam lever 116 and the magnetic circuit in the closed position whereas FIG. 5B illustrates the cam lever and magnetic circuit in the open position.

In operation, the sensor circuit 150 is configured to monitor and detect the flow of water passing through flow path 118. Under normal operating conditions, the cam lever 116 is in the closed position illustrated in FIG. 5A and the valve plug 122 is in the open position (i.e., separated from the valve seat 124). The cam lever 116 is held in the closed position as shown in FIG. 5A by the magnetic circuit shown in FIG. 6A. The magnetically conductive materials 132, 134, and 136 in combination with the magnetic source 137 comprise a magnetic circuit that has a permanent magnetic flux in the direction, for example, of the arrow shown pictorially in FIG. 6A. The cam lever 116 is held in the closed position by the magnetic circuit, which generates a permanent magnetic flux. Thus, for example, magnetic source 137 may comprise a permanent magnet. The holding force of the permanent magnets 137 is sufficiently strong to keep the cam lever 116 from inadvertently tripping, for example, from a bump, jar or vibration. In one aspect, the magnetic source 137 is a neodymium magnet for providing the sufficiently strong holding holding force. A coil, powered by electricity, is positioned about at least one of the magnetically conductive materials of the magnetic circuit 130. As illustrated, in one particular aspect, coil 138 is disposed about magnetically conductive material 136. The coil 138 is electrically connected to an electrical source, such as those previously described. As shown in FIG. 6A, the coil 138 is deenergized thereby permitting magnetic flux within the magnetic circuit as pictorially illustrated by the arrows passing through magnetically conductive materials 132, 134, 136, and magnetic source 137 which secures the cam lever 116 in the closed position as shown. Upon energizing the coil 138 the coil magnetomotive force (MMF) counters the permanent magnet MMF yielding near zero flux through the circuit as pictorially represented in FIG. 6B. With the coil 138 energized, the cam lever 116 is kicked open with sufficient force by a a torsion spring of sufficient pre-load to prevent the cam lever 116 from stalling or getting hung up. After the coil 138 is deenergized, the cam lever 116 may be rotated back to the latched position to complete the magnetic circuit by completing the magnetic circuit 130 by bringing magnetically conductive material 132 into contact with magnetically conductive materials 134 and 136 and magnetic source 137. As best illustrated in FIG. 5A, when the cam lever 116 is in the closed position as shown also in FIG. 6A, the valve plug 122 is in the open positioned thereby permitting water to flow through the flow path 118. Conversely, as best illustrated in FIG. 5B, when the cam lever 116 is in the open position as shown also in FIG. 6B, the valve plug 122 is seated against the valve seat 124 and the flow path 118 is closed. The cam lever 116 is hinged to rotate as shown and includes a cam surface upon which the valve stem 126 is in contacting and following engagement with as the cam lever 116 is moved between open and closed positions as shown in FIGS. 5A-5B and FIGS. 6A-6B.

The valve plug 122 is configured so that the valve stem 126 is biased toward the cam surface of the cam lever 116 so as to follow the radially graduated profile during movement of the cam lever 116 between opened and closed positions. Thus, the radially graduated surface on the cam lever 116 causes the valve plug 122 to open when the cam lever 116 is moved to the closed position shown in FIGS. 5A and 6A and allows the valve plug 122 to seat against the valve seat 124 when the cam lever 116 is moved to the open position as best illustrated in FIGS. 5B and 6B. Under normal operating conditions, the cam lever 116 is in the closed position as shown in FIGS. 5A and 6A so that the valve plug 122 is open to permit water flow through the flow path 118. Flow of water through the flow path 118 is detected by the sensor circuit 115. When adequate water flow occurs, the ram 142 is displaced as best illustrated in FIG. 7A-7B. The ram 142 is made up of one or more ferrous type materials. As discussed previously, a coil 158 is disposed about the chamber 148 within which the ram 142 is operably disposed. Water flowing into the chamber 148 causes the ram 142 to be displaced from its position shown in FIG. 7A to its position shown in FIG. 7B. In the position shown in FIG. 7A, the ram 142 occupies the inlet 144 to the chamber 148 and the ram 142 seats against the ram seat 162 of the chamber 148. In FIG. 7B the ram 142 is displaced from the inlet 144 and off of the ram seat 162 to allow water to pass through the chamber 148 and out the outlet 128 of the flow path 118. As the ram 142 moves from the closed position shown in FIG. 7A to the open position shown in FIG. 7B the ram may be configured to be received on guide 146 disposed within chamber 148 of the sensor circuit 150. The coil 158 and the one or more elements comprising, for example, nonconductive elements 152, 154, and 156 make up a magnetic circuit having a flux path 160 as represented pictorially in FIGS. 7 A-7B. Upon movement of the ram 142 into the flux path 160 of the magnet circuit, the orientation of the sensor magnetic circuit is changed as well as the inductance of the coil 158. In this manner, upon detecting a change in the inductance of the coil 158, water flow through the sensor circuit 150 is detected. Upon the stoppage of water flow through the inlet 144 and chamber 148 and out the outlet 128 of the flow path 118, the ram 142 moves from the open position shown in FIG. 7B to the closed position shown in FIG. 7A.

As discussed previously, a circuit timer may be connected in operable communication with the sensor circuit 150 so that when the inductance of the coil 158 changes the sensor circuit starts a timer. If water flow sustains a set period of time (e.g., user set period of time or manufacturer set period of time) the timing circuit, as described previously, pulses the coil 138 in the magnetic circuit 130 which counters the MMF of the permanent magnet(s) in the magnetic circuit thereby reducing the holding force of the circuit to a near zero value, which a torsion spring of sufficient pre-load then rotates the cam lever 116 open with sufficient force to prevent the cam lever 116 from stalling or getting hung up. The valve stem 126 follows the radially graduated profile of the cam lever 116 causing the valve plug 122 to close. The open cam lever 116 provides an indication to the user that the valve assembly 100 has been "tripped" (i.e., water has flowed through the valve longer than the set period of time of the timing circuit) and will not permit water flow through the flow path 118 until the cam lever 116 is reset to its closed or latched position as shown in FIGS. 5A and 6A. As previously discussed, one or more signals or indicators, whether audible, visual or otherwise, may be used alone or together with the cam lever 116 to apprise the user that the valve assembly 100 has been tripped. In the case where water flow through the valve assembly 100 stops prior to the time of the timing circuit elapsing, the ram moves from the open position shown in FIG. 7B to the closed position shown in FIG. 7A and thus the inductance of the sensor circuit 150 is no longer altered. The timer on the timer circuit is reset and awaits detection of water flowing through the flow path 118 again which restarts the timer.

In conclusion, the water conservation safety shut-off valve assembly 10 of the present invention is manually set to an open position and allows water or other fluids to run through the valve assembly 10 under normal use. When a preset time value or duration has timed out with water or fluid flowing through the valve continually, the valve closes indicating that there is a problem with the downstream usage of the water supply or that the desired time has simply elapsed. The valve assembly can generate its own electricity to run the electronics and the timer circuit or can have the electronics powered by a battery 60 or through standard household power via a power cord 62.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:
1. A fluid shut-off valve assembly comprising:
 a valve body having a fluid passageway, wherein in at least a portion of the fluid passageway is sensor monitored for flow detection;
 a valve stem having a valve plug moveable between an open position and a closed position;
 a flow detection device having:
  (a) a linearly moveable ram within the portion of the fluid passageway and configured to selectively move within an electromagnetic coil upon flow of fluid through the fluid passageway, wherein the moveable member within the electromagnetic coil alters inductance of the electromagnetic coil;
  (b) a sensor configured to detect the altered inductance of the electromagnetic coil and thereby displacement of the moveable ram and the flow of fluid through the fluid passageway;
 a magnetic circuit electrically connected to the flow device and having a magnet and a latch, with the magnet normally maintaining The valve plug in an open position;
 a timer operably associated with the flow detection device and electronicaly connected to the magnetic circuit, wherein the timer is configured to time duration of fluid flowing through the passageway, and to energize the coil after a pre-set time set period expires, to thereby open the latch to allow the valve plug to close.

2. The valve assembly of claim 1 wherein the latch further comprises a cam lever having a radially graduated profile, wherein the valve stem follows the radially graduated profile.

3. The valve assembly of claim 1 wherein energizing the electromagnetic coil of the magnetic circuit results in near zero flux through the magnetic circuit.

4. The valve assembly of claim 1 wherein the electromagnetic coil of the flow detection device surrounds the portion of the fluid passageway.

5. The valve assembly of claim 1 Wherein the moveable member comprises a ferrous component moveable within the portion of the fluid passageway under magnetic flux from the sensor for detecting fluid flow.

6. A fluid shut-off valve assembly comprising:
a valve body having a fluid passageway;
a fluid ram within the fluid passageway moveable between a first position and a second position;
a fluid ram detector external to the fluid passageway, the fluid ram detector having a flux path extending into the fluid passageway, wherein inductance of the flux path is monitored for detecting the first position or the second position of the fluid ram; and
a valve plug within the fluid passageway upstream of the fluid ram, wherein the valve plug includes a valve stem with at least a portion disposed outside the fluid passageway;
a timing circuit having a timer activated by detecting the first position or the second position of the fluid ram; and
a magnetic circuit electrically connected to the timing circuit and having a latch comprising a portion of the magnetic circuit, wherein energizing the electromagnetic coil of the magnetic circuit permits the latch to open under a biasing force acting upon the latch;
the valve plug moving from a normally open position to a closed position after the timer reaches a pre-selected time limit.

7. The valve assembly of claim 6 wherein the latch further comprises a cam lever having an open position and a closed position, wherein the fluid passageway is closed in the closed position.

8. The valve assembly of claim 6 Wherein the fluid ram is linearly movable from the first position outside of the flux path to the second position inside of the flux path and at least partially within the fluid ram detector.

9. The valve assembly of claim 6 further comprising:
an electromagnetic coil surrounding the fluid passageway and providing the flux path to the fluid ram detector, wherein the timer is activated by an inductance change in the electromagnetic coil.

10. The valve assembly of claim 6 further comprising:
a guide member disposed within the fluid passageway received within the fluid ram in the first or second position.

11. A method of a fluid shut-off valve assembly, comprising:
providing a valve body having a fluid passageway;
detecting fluid flow through the passageway by monitoring displacement of fluid ram within the fluid passageway;
wherein moving the fluid ram into a flux path with flow through the fluid passageway causes an inductance change;
starting a timer upon detecting displacement of the fluid ram;
energizing an electromagnetic coil of a magnetic circuit to permit a latch comprising a portion of the magnetic circuit to open under a biasing force acting upon the latch; and
actuating a valve plug for closing the fluid passageway after the timer reaches pre-selected time.

12. The method of claim 11 further comprising:
following a radially graduated profile on the latch for actuating the valve plug.

13. The method of claim 11 further comprising:
moving the latch between released and latched positions for rotating a radially graduated profile on the latch.

14. The method of claim 11 wherein electromagnetically releasing the latch both indicates a triggered state and actuation of the valve plug to a closed position for closing the fluid passageway.

15. The method of claim 11 wherein energizing the electromagnetic coil of the magnetic circuit results in near zero flux through the magnetic circuit such that the magnetic circuit no longer overcomes the biasing force and permits the latch to move from the closed position to the open position.

* * * * *